United States Patent
Ikeda et al.

(10) Patent No.: US 7,058,215 B2
(45) Date of Patent: Jun. 6, 2006

(54) DATA PROCESSING SYSTEM, MAINTENANCE APPARATUS AND IMAGE PROCESSING APPARATUS

(75) Inventors: Yuichi Ikeda, Chiba (JP); Nobuatsu Sasanuma, Chiba (JP); Kazuo Suzuki, Kanagawa (JP); Tomohisa Itagaki, Chiba (JP); Nobuhiko Zaima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 09/982,177

(22) Filed: Oct. 19, 2001

(65) Prior Publication Data

US 2002/0131629 A1    Sep. 19, 2002

(30) Foreign Application Priority Data

Jan. 18, 2001    (JP)    ............................. 2001-010173

(51) Int. Cl.
*G06K 9/00*    (2006.01)
(52) U.S. Cl. ...................................... 382/135; 382/100
(58) Field of Classification Search ................ 382/100, 382/274, 135, 254–275; 348/606–624; 358/1.9–3.31, 358/447, 461, 463; 713/176; 283/72, 85, 283/93
See application file for complete search history.

(56) References Cited

U.S. PATENT DOCUMENTS

| | | | | |
|---|---|---|---|---|
| 5,321,470 A * | 6/1994 | Hasuo et al. | ............... | 399/366 |
| 5,471,281 A | 11/1995 | Hayashi et al. | ............. | 155/201 |
| 5,617,187 A | 4/1997 | Hayashi et al. | ............... | 399/32 |
| 5,650,863 A | 7/1997 | Utagawa et al. | ............ | 358/475 |
| 5,659,628 A | 8/1997 | Tachikawa et al. | | |
| 5,696,594 A | 12/1997 | Saito et al. | | |
| 5,915,027 A * | 6/1999 | Cox et al. | ..................... | 380/54 |
| 6,048,117 A | 4/2000 | Banton | | |
| 6,051,826 A | 4/2000 | Arimoto et al. | ......... | 250/208.1 |
| 6,078,682 A | 6/2000 | Tanioka et al. | ............. | 382/135 |
| 6,104,812 A * | 8/2000 | Koltai et al. | ................... | 380/51 |
| 6,104,826 A * | 8/2000 | Nakagawa et al. | ......... | 382/100 |
| 6,154,571 A * | 11/2000 | Cox et al. | .................... | 382/250 |
| 6,185,312 B1 * | 2/2001 | Nakamura et al. | .......... | 382/100 |
| 6,222,932 B1 * | 4/2001 | Rao et al. | .................... | 382/100 |
| 6,285,776 B1 * | 9/2001 | Rhoads | ....................... | 382/100 |
| 6,359,905 B1 * | 3/2002 | Ogino et al. | ................ | 370/479 |
| 6,661,904 B1 * | 12/2003 | Sasich et al. | ............... | 382/100 |
| 2001/0019659 A1 * | 9/2001 | Hirai | ........................... | 386/83 |

FOREIGN PATENT DOCUMENTS

| | | |
|---|---|---|
| EP | 0 655 853 | 5/1995 |
| EP | 0 912 042 | 4/1999 |
| JP | 5-091316 | 4/1993 |
| JP | 6-113113 | 4/1994 |
| JP | 7-256938 | 10/1995 |
| JP | 11-327835 A | 11/1999 |
| JP | 2000-132365 A | 5/2000 |
| JP | 2000-165643 A | 6/2000 |
| JP | 2000-242605 A | 9/2000 |
| JP | 2000-324334 A | 11/2000 |

* cited by examiner

*Primary Examiner*—Joseph Mancuso
*Assistant Examiner*—Craig Kronenthal
(74) *Attorney, Agent, or Firm*—Fitzpatrick, Cella, Harper & Scinto

(57) ABSTRACT

This invention relates to a method of setting anti-forgery information addition level while taking an apparatus individual difference into consideration. The method is employed by a data processing system including: an image processing apparatus 100 for processing an image; and a maintenance apparatus 120, connected with the image processing apparatus through a network 110, for setting a processing function of the image processing apparatus 100. The maintenance apparatus 120 determines an anti-forgery information addition level depending on an individual difference of apparatuses, such as an exhaustion level of the image processing apparatus 100. The addition level determined by the maintenance apparatus 120 is transmitted to the image processing apparatus 100. The image processing apparatus 100 adds anti-forgery information to an inputted image at the addition level transmitted by the maintenance apparatus 120.

9 Claims, 12 Drawing Sheets

DATA PROCESSING SYSTEM, MAINTENANCE APPARATUS AND IMAGE PROCESSING APPARATUS

FIELD OF THE INVENTION

The present invention relates to an image processing apparatus which improves data addition processing in the image processing apparatus together with a maintenance apparatus, and a maintenance apparatus as well as a data processing system.

BACKGROUND OF THE INVENTION

Recently, image formation capabilities of an image forming apparatus, represented by a color printer or a color copying machine or the like make steady improvement. With the use of such image forming apparatus, it is relatively easy to form high-quality images. On the other hand, there have been concerns about employing such image forming apparatus for forging securities such as bank notes or the like. To cope with such concerns, various anti-forgery techniques have been considered.

Discussed hereinafter is a technique of adding a dot pattern, indicative of a machine number of an image processing apparatus, to a color image. In order to enhance the anti-forgery effect, it is preferable to print the dot pattern regularly throughout the image. However, it is not desirable if the added anti-forgery information deteriorates the quality of the original image. Therefore, it is necessary to find a method of adding anti-forgery information while preventing image quality from being deteriorated. For instance, there is a method of adding AddOn data only on a yellow-printed surface. The AddOn is a type of anti-forgery information, which is a dot pattern added for the anti-forgery purpose.

However, the aforementioned technique does not consider individual differences among image forming apparatuses or exhaustion and deterioration of the apparatus due to usage. Generally, the longer an apparatus is used, the more the apparatus is exhausted or deteriorated. Therefore, the judgment level of AddOn largely depends upon individual differences among apparatuses. For instance, assuming that the AddOn addition level is uniform for all image forming apparatuses, the AddOn is printed too dark by one apparatus and too light by another apparatus. In other words, setting a most appropriate addition level depending upon individual differences among apparatuses has been a problem to be solved.

The applicant of the present invention has filed a technique used in an image processing apparatus having an environment sensor, for controlling an addition level depending on a state detected by the environment sensor. However, even though the environment sensor can predict an anti-forgery information addition level, since the environment sensor does not detect the information addition level on the print medium (paper or the like) on which an image is formed by an image forming apparatus, the addition level is not necessarily most appropriate.

Furthermore, enough consideration has not been given on the management method of whether or not an image processing apparatus appropriately employs the AddOn function including the above-discussed appropriate addition-level setting, thus it is susceptible to improvement. Moreover, sufficient deliberation has not been made on a method of adding new addition information in addition to predetermined AddOn addition information.

SUMMARY OF THE INVENTION

The present invention has been proposed to solve the conventional problems, and has as its object to provide an image processing apparatus, an image processing method, and a storage medium, which enable improvement of data addition processing that is visually inconspicuous, in the image processing apparatus together with a maintenance apparatus.

Furthermore, an object of the present invention is to provide a method of setting a most appropriate anti-forgery information addition level in accordance with individual differences among apparatuses, an image processing apparatus utilizing the setting method, a maintenance apparatus, and a data processing system. More specifically, the present invention provides an image processing apparatus setting method of setting an anti-forgery information addition level for an image processing apparatus forming an image inclusive of anti-forgery information, comprising the steps of: checking an image processing capability of the image processing apparatus or an exhaustion level of an image processing function; determining an anti-forgery information addition level appropriate for the image processing apparatus based on a checking result obtained at said checking step; and setting the addition level, determined at said determination step, to the image processing apparatus.

It is another object of the present invention to provide a data processing system including an image processing apparatus for processing an image and a maintenance apparatus for setting a processing function of said image processing apparatus, said maintenance apparatus connected with said image processing apparatus through a network, wherein said maintenance apparatus determines an anti-forgery information addition level in accordance with an image processing capability of said image processing apparatus or an exhaustion level of the image processing function, and said image processing apparatus adds anti-forgery information to an inputted image at said addition level.

According to the present invention, the foregoing object is attained by providing a data processing system including an image processing apparatus for processing an image and a maintenance apparatus for setting a processing function of said image processing apparatus, said maintenance apparatus connected with said image processing apparatus through a network, wherein said image processing apparatus comprises: image forming means for forming an image to which anti-forgery information is added at a predetermined addition level; reading means for reading the image formed by said image forming means; and transmission means for transmitting the image, read by said reading means, to said maintenance apparatus through the network, and said maintenance apparatus comprises: reception means for receiving the image, inclusive of the anti-forgery information, transmitted by said transmission means of said image processing apparatus; and setting means for determining an addition level appropriate for said image processing apparatus based on the image received by said reception means, and setting the determined addition level to said image processing apparatus, wherein said image forming means adds anti-forgery information to the image at the addition level set by said setting means.

According to the present invention, the foregoing object is attained by providing a data processing system including an image processing apparatus for processing an image and a maintenance apparatus for setting a processing function of said image processing apparatus, said maintenance apparatus connected with said image processing apparatus through a network, wherein said image processing apparatus comprises: image forming means for forming an image, inclusive of anti-forgery information in a plurality of addition levels; reading means for reading the image formed by said image forming means; and transmission means for transmitting the image, read by said reading means, to said maintenance apparatus through the network, and said maintenance apparatus comprises: reception means for receiving the image inclusive of the anti-forgery information, transmitted by said transmission means of said image processing apparatus; and setting means for selecting an addition level appropriate for said image processing apparatus from the plurality of addition levels based on the image received by said reception means, and setting the selected addition level to said image processing apparatus, wherein said image forming means adds anti-forgery information to a next input image at the addition level set by said setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. The embodiments are provided for the purpose to allow those who are skilled in the art to easily practice the present invention. Therefore, the following embodiments are not intended to limit the scope of the claimed invention.

First Embodiment

The first embodiment is provided for setting an addition level of visually inconspicuous anti-forgery information (AddOn) in an image processing apparatus, such as an image forming apparatus or the like, while taking individual differences of the apparatuses into consideration. Herein, the individual differences mean image processing capabilities of each apparatus or exhaustion levels of image processing functions.

Figure 1:
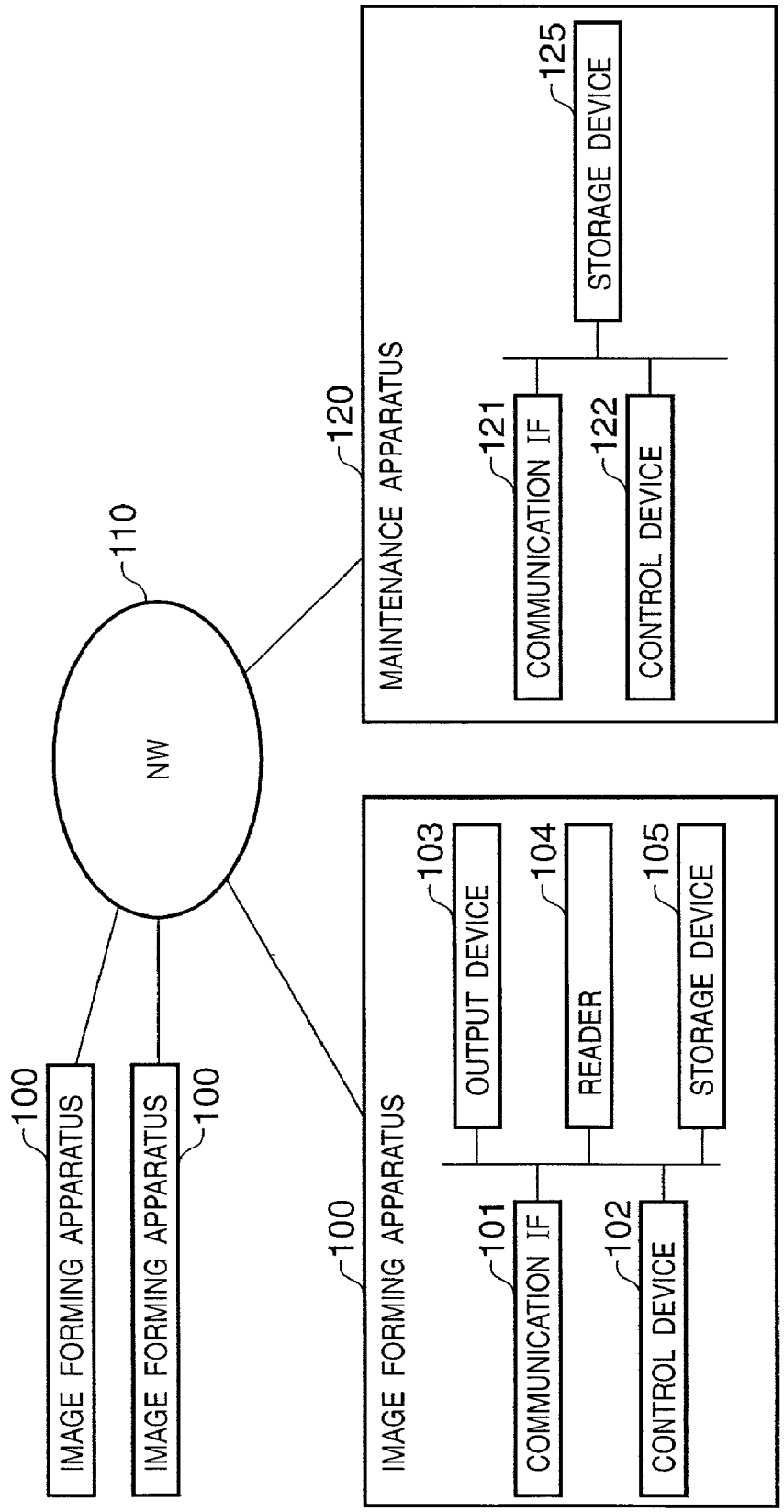
FIG. 1 is an exemplary diagram showing a system structure according to an embodiment of the present invention.

FIG. 1 shows a brief structure of a data processing system according to the first embodiment. An image forming apparatus 100 is an apparatus for forming an image, such as a copying machine. Each image forming apparatus 100 is connected to a network (NW) 110. The image forming apparatus 100 includes: a communication interface (IF) 101 for communicating through the network, a control device 102 for executing various functions, an output device 103 for forming and outputting an image, a reader 104 for reading an image, and a storage device 105 for storing various data. Therefore, the output device 103 serves as image forming means; the reader 104 serves as image reading means; and the communication IF 101 serves as transmission means for transmitting an image, read by the reader 104, to a maintenance apparatus 120. Furthermore, the storage device 105 serves as addition-level storage means for storing an addition level set by the maintenance apparatus 120, test pattern storage means for storing a test pattern, and anti-forgery information storage means for storing anti-forgery information. Note in a case where the storage device 105 stores a plurality of anti-forgery information, the control device 102 serves as selection means for selecting one from the plurality of anti-forgery information.

Furthermore, the maintenance apparatus 120 for maintaining the image forming apparatuses 100 is connected to the network 110 (intranet, Internet or the like). Note that the maintenance apparatus is often placed in a service center. The maintenance apparatus 120 includes: a communication interface (IF) 121 for communicating through the network, a control device 122 for executing various functions, and a storage device 125 for storing various data. Herein, the communication IF 121 serves as reception means for receiving an image including anti-forgery information transmitted by the communication IF 101 of the image forming apparatus 100. Furthermore, the control device 122 serves as determination means for determining an addition level appropriate for the image forming apparatus 100 based on the image transmitted by the communication IF 101, and setting means for setting the determined addition level to the image forming apparatus 100. Note that the communication IF 121 also serves as transmission means for transmitting the addition level, determined by the determination means, to the image forming apparatus 100. Furthermore, the storage device 125 serves as storage means for storing reference data used in determination of the addition level.

Figure 2:
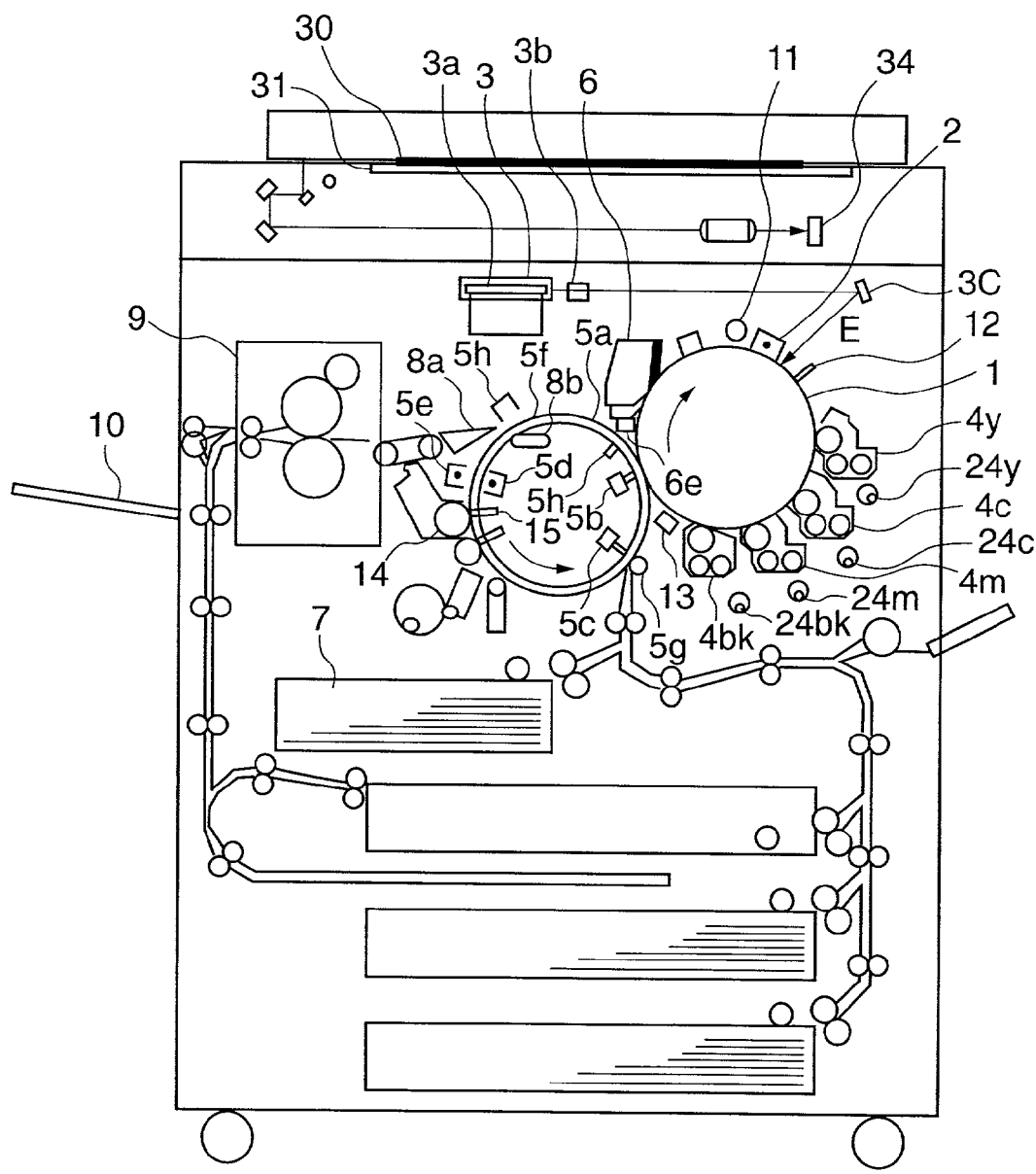
FIG. 2 is a cross section of an image forming apparatus according to an embodiment of the present invention.
Figure 3:
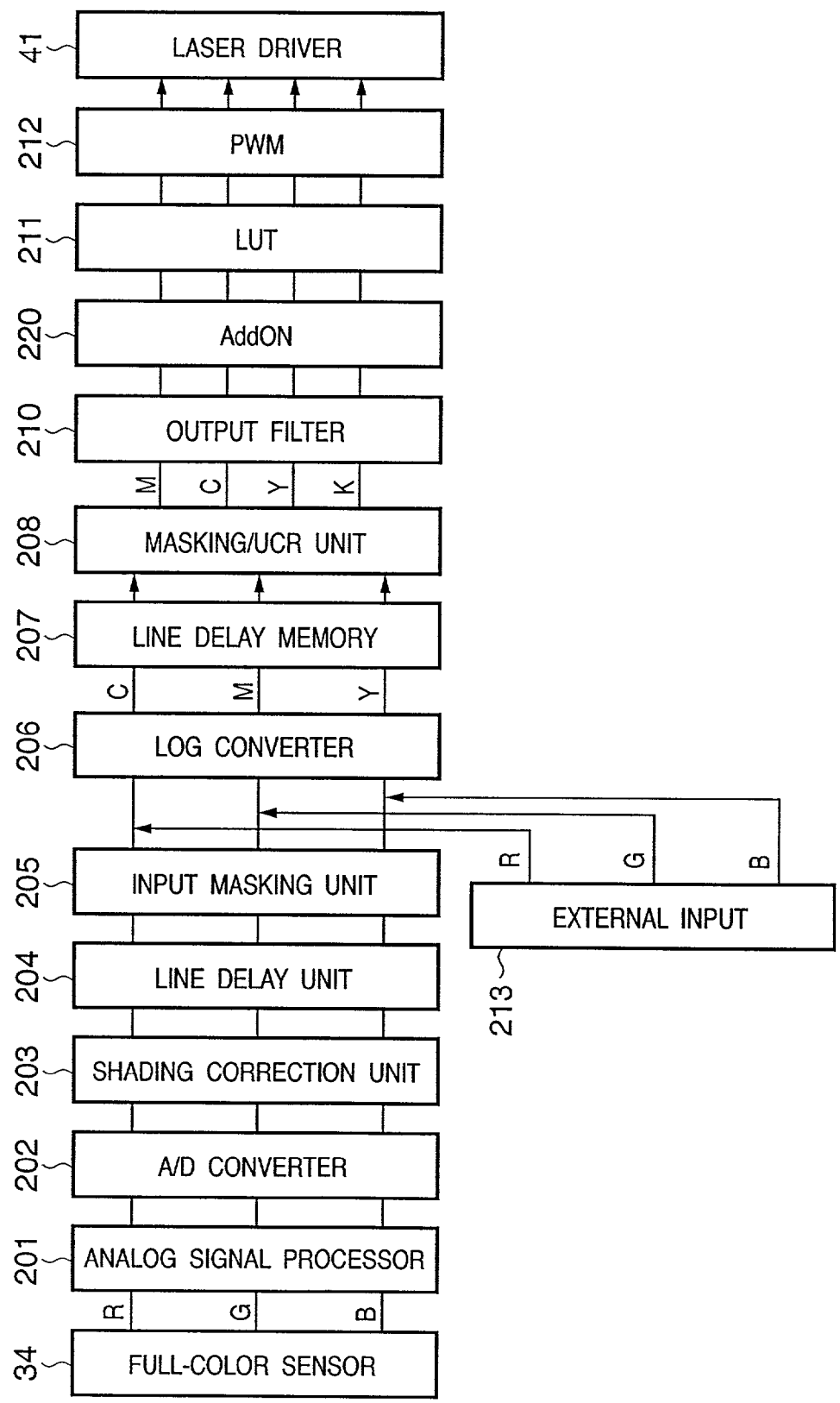
FIG. 3 is an exemplary diagram showing an image signal processing circuit according an embodiment of the present invention.

The construction of the image forming apparatus 100 is described in detail with reference to FIGS. 2 and 3. For the purpose of explanatory convenience, the description is provided on a case where the image forming apparatus is an electrophotographic digital copying machine. FIG. 2 is a brief cross section of the image forming apparatus. FIG. 3 is a block diagram of the image forming apparatus. The structure of the image forming apparatus and image forming steps are described in detail hereinafter with reference to the drawings.

Referring to FIG. 2, when a copy key (not shown) is depressed, an exposure lamp 32 in the reader unit exposes light and scans an original document 30 placed on an original document placement glass 31. The reflected optical image of the original document 30 is condensed to a full-color sensor 34, such as a CCD or the like. The full-color sensor 34 separates the original document 30 into a large number of pixels, and generates a photoelectric conversion signal corresponding to density of each pixel. In the foregoing manner, color-separated image signals of the original document 30 are obtained.

Referring to FIG. 2, the image signal outputted by the full-color sensor 34 is inputted to an analog signal processor 201. The analog signal processor 201 adjusts gains and offsets of the image signal. Next, an A/D converter 202 converts the image signal to, for instance, R, G and B digital signals each having 8 bits (0 to 255 levels: 256 tones), for each color component. A shading correction unit 203 performs processing for eliminating unevenness caused by uneven sensitivity of each of the sensor cells arranged in line in the CCD. More specifically, a signal obtained by reading a reference white plate for each color component is used to optimize a gain for each of the CCD sensor cells. This is so-called shading correction.

A line delay unit 204 corrects a spatial offset included in the image signal, outputted by the shading correction unit 203. The spatial offset is generated because line sensors of the full-color sensor 34 are arranged apart from one another by a predetermined distance in the sub-scanning direction. More specifically, with the B component signal as a basis, each of the R and G component signals is delayed by line in the sub-scanning direction, thereby synchronizing the phase of the three color component signals.

An input masking unit 205 converts the color space of the image signal, outputted by the line delay unit 204, to NTSC standard color space by matrix operation shown in equation (1). In other words, the color space of each color component signal, outputted by the full-color sensor 34, which is determined by a spectral characteristic of a filter for each color component, is converted to the NTSC standard color space.

$$\begin{bmatrix} Ro \\ Go \\ Bo \end{bmatrix} = \begin{bmatrix} a11 & a12 & a13 \\ a21 & a22 & a23 \\ a31 & a32 & a33 \end{bmatrix} \begin{bmatrix} Ri \\ Gi \\ Bi \end{bmatrix} \quad (1)$$

where Ro, Go, Bo are output image signals and Ri, Gi, Bi are input image signals.

Original color image data, displayed on a CRT display of a computer, is inputted from an external input 213 as an image signal. An LOG converter 206, constructed with a look-up table (LUT) stored in, e.g., ROM or the like, converts R, G, and B luminance signals, outputted by the input masking unit 205, to C, M, and Y density signals. The line delay memory 207 delays the image signal outputted by the LOG converter 206 for a period (line delay period), during which a black letter determination unit (not shown) generates control signals UCR, FILTER, SEN and so forth based on the output of the input masking unit 205.

A masking/UCR unit 208 extracts a black component signal K from the image signal, outputted by the line delay memory 207, performs matrix operation on Y, M, C, and K image signals for correcting color turbidity of a color material in the printer unit B, and outputs a color component image signal having, e.g., 8 bits, in order of Y, M, C and K for each reading operation of the reader unit A.

If necessary, a γ correction unit may be provided. The γ correction unit performs density correction on the image signal, outputted by the masking/UCR unit 208, for correcting the image signal to have an ideal tone characteristic of the printer unit. An output filter (spatial filter processing unit) 210 performs edge stress processing or smoothing processing on the image signal outputted by the γ correction unit.

An AddOn unit 220 supplies given information to the image signal to form a pattern for anti-forgery tracking purpose.

The LUT 211, constructed with RAM or the like, is provided for matching the density of the output image with the density of the original image.

A pulse-width modulator (PWM) 212 outputs a pulse signal having a pulse width corresponding to the level of an inputted image signal. The pulse signal is inputted to the laser driver 41 which drives a laser beam source 42.

Laser beam K emitted by a semiconductor laser is swept by a rotational polygon mirror 3a, and a spot image is formed on a photosensitive drum 1 by a lens 3b such as a f/θ lens or the like and a fixed mirror 3c which directs laser beam E to the photosensitive drum 1 serving as an image transfer drum. The laser beam E scans the photosensitive drum 1 in the direction substantially parallel to the rotation axle of the photosensitive drum 1 (main scanning direction), and repeats scanning the photosensitive drum 1 in the rotation direction of the photosensitive drum 1 (sub-scanning direction), thereby forming an electrostatic latent image.

In the printer unit, the photosensitive drum 1, serving as an image transfer drum, has amorphous silicon, selenium, OPC and so forth on the surface. The photosensitive drum 1 is rotatably arranged in the direction indicated by the arrow (FIG. 2), and surrounded with a pre-exposure lamp 11, a corona charger 2 serving as electrostatic charging means, a laser exposure optical system 3, a surface potential sensor 12, four development machines 4y, 4c, 4m, and 4bk provided for different colors, a detector 13 for detecting the state of the photosensitive drum, a transfer device 5, and a cleaning device 6.

When an image is formed, the photosensitive drum 1 in the printer unit is rotated in the direction indicated by the arrow to uniformly eliminate electricity by the pre-exposure lamp 11, then uniformly charged by the primary charger 2, and subjected to exposure and scanning of the laser beam E modulated in correspondence with the aforementioned image data signal. As a result, an electrostatic latent image corresponding to the image data signal is formed.

Next, a predetermined development machine is operated to perform reversal development of the electrostatic latent image on the photosensitive drum 1 with the use of two-component developer consisting of toner and a carrier. A negative-charged visible image (toner image), having resin as a base substance, is formed on the photosensitive drum 1. Each of the development machines, selected in accordance with each separated color, approaches the photosensitive drum 1 by the operation of eccentric cams 24y, 24c, 24m, and 24bk. Herein, reversal development is a developing method of attaching toner, which is electrostatically charged to the same polarity as the latent image, to the area of the photosensitive body exposed by light, thereby forming a visible image.

The toner image formed on the photosensitive drum 1 is transferred to a print material, supplied from a print material cassette 7 to the position opposite to the photosensitive drum 1 via the conveyance system and transfer device. The transfer device 5 comprises: a transfer drum 5a serving as a print material holding body in this embodiment, a transfer brush charger 5b serving as transfer means, an adsorption brush charger 5c for electrostatically adsorbing a print material, an adsorption roller 5g facing the adsorption brush charger 5c, an inner charger 5d, an outer charger 5e, and a transfer detachment sensor 5h. In the peripheral open area of the surface of the transfer drum 5a, which is supported by an axle so as to be rotatably driven, a print material holding sheet 5f consisting of a dielectric is integrally provided in the cylindrical manner. The print material holding sheet 5f uses a dielectric sheet, such as polycarbonate.

Along with rotation of the transfer device having a drum shape, i.e., transfer drum 5a, the transfer brush charger 5b transfers the toner image on the photosensitive drum 1 onto a print material, held by the print material holding sheet 5f. When a desired number of color toner images are transferred to the print material, the print material is separated from the transfer drum 5a by the operation of a separation claw 8a, a separation pushing roller 8b, and a separation charger 5b, then discharged to a tray 10 through a heat roller fixer 9, and outputted as a full-color image.

After an image is transferred, the photosensitive drum 1 cleans remaining toner on the surface by the cleaning device 6 having a cleaning blade 6e and a rake sheet, and prepares for the next image formation process.

A back-up brush 15 performs cleaning to prevent flying or attachment of powder on the print material holding sheet 5f or oil attachment to a print material. The aforementioned cleaning is performed before or after image formation. However, in the event of jamming (paper jams), cleaning is performed whenever necessary.

Upon conversion of the LUT 211, the signal is converted by the PWM 212 to a signal corresponding to a dot width, and transferred to the laser driver 41. Then, a latent image, whose tones are expressed by changing a dot's area, is formed on the photosensitive drum 1 by laser scanning, and a tone image is obtained after the process of development, transfer, and fixing.

Note the embodiment of the present invention employs yellow, magenta, cyan, and black toner, each of which is formed by distributing each color material with styrene copolymer resin as a binder.

Figure 4:
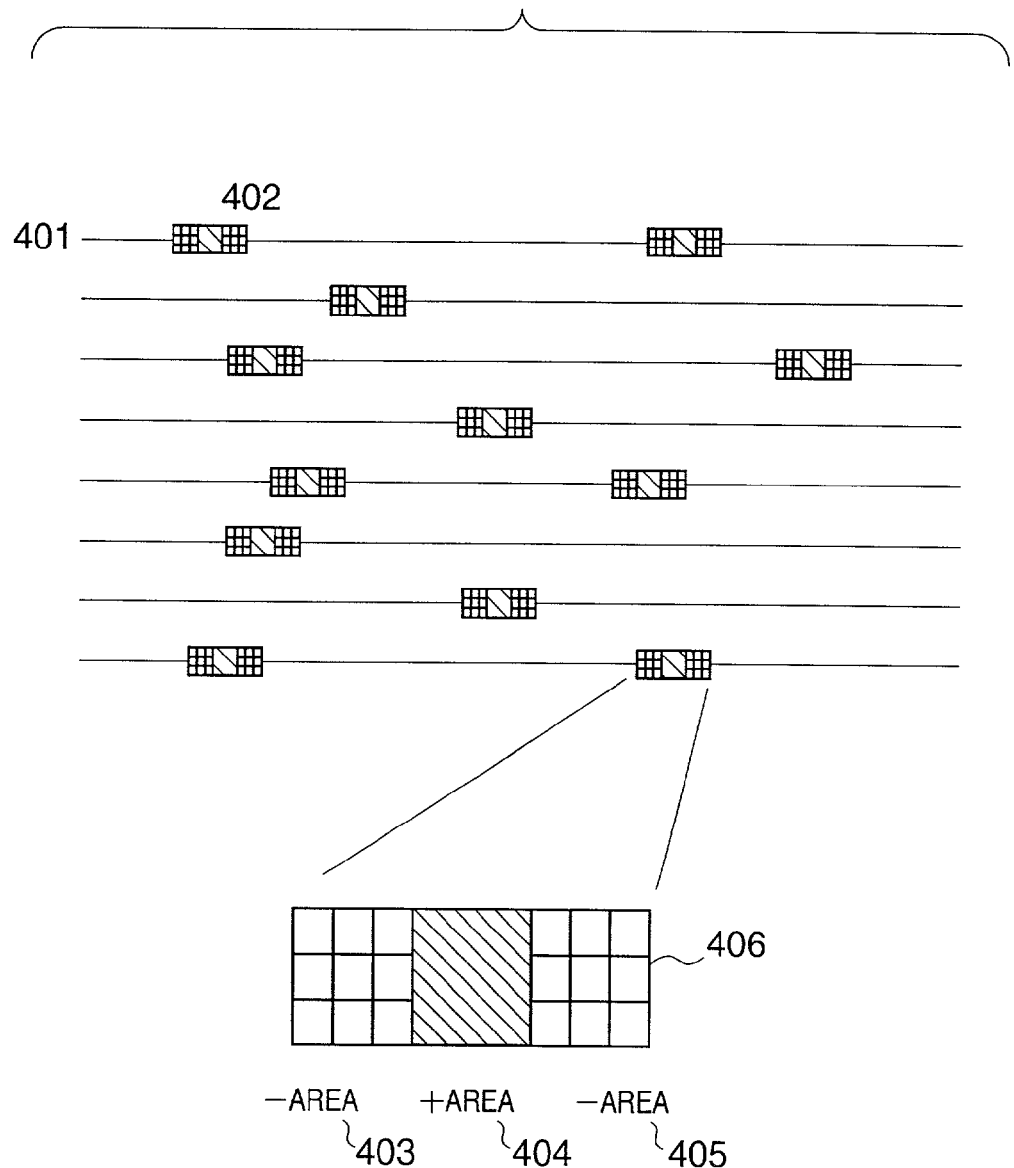
FIG. 4 is a conceptual view of exemplary AddOn according to an embodiment of the present invention.

FIG. 4 shows an example of AddOn dot pattern generated by the first embodiment. The AddOn dot pattern, which is the minimum unit expressing anti-forgery information, is formed by plural AddOn dots 402. In other words, an identification number of an image forming apparatus or the like is expressed by an arrangement of the AddOn dot pattern. For instance, encrypted data (added data integrating information transmitted from each machine and information unique to an engine) is expressed by the positional relation of the AddOn dots in the main-scanning direction. More specifically, the distance between the first-appearing AddOn dot and the next-appearing AddOn dot can be associated with numerical data or character data to express numerical information or character information. Sharing appropriate AddOn-dot arrangement rules between a transmitter side and a receiver side enables to transmit data indicative of machines, using an AddOn dot pattern as a medium.

Figure 8:
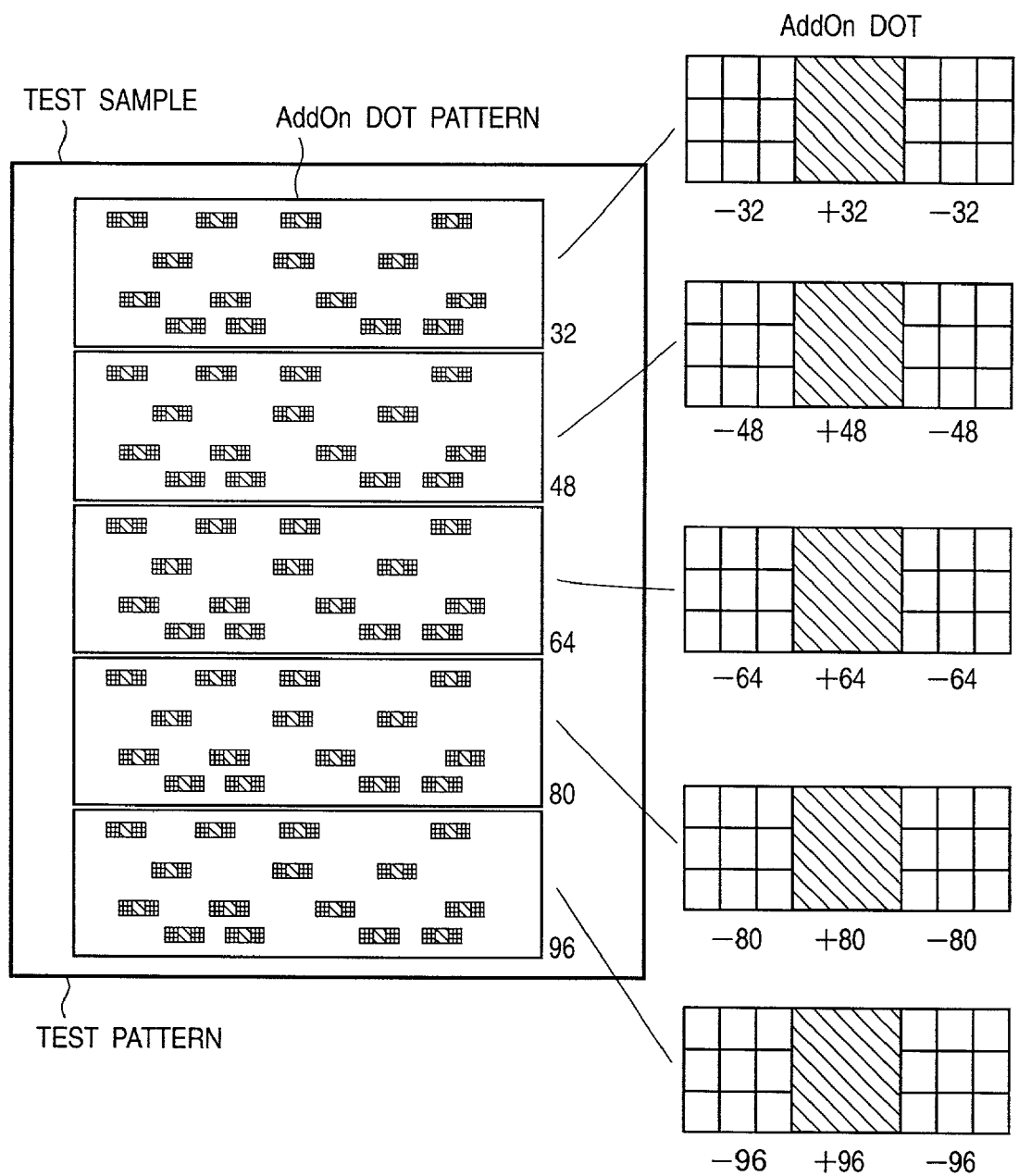
FIG. 8 is a view showing an exemplary test pattern according to an embodiment of the present invention.

Embedded in AddOn line 401 is an AddOn dot pattern in the yellow plane. Reference numeral 406 shows an enlarged AddOn dot 402. An AddOn dot has two types of areas. One is the +area 404 obtained by adding a fixed level to an original image signal. The other is the −areas 403 and 405 obtained by subtracting a fixed level from the original image. Note that the AddOn dot pattern may be repeatedly printed plural numbers of times within one page as shown in FIG. 8. In the example shown in FIG. 8, an AddOn dot pattern having the same arrangement is repeatedly printed five times.

In the first embodiment, the +area and −area respectively have 48 levels. For instance, assume an AddOn dot pattern having 48 levels is added to the entire surface of a halftone image having 80 levels of M, C, Y, and K. While M, C and K are outputted as 80-level halftone images, Y is outputted in 80−48=32 levels in the −area of the AddOn dot pattern and outputted in 80+48=128 levels in the +area of the AddOn dot pattern.

The AddOn dot pattern, added to the image in the foregoing manner, can be read by an image scanner or the like after being outputted as a color image, and only the yellow plane can be extracted for dot pattern analysis to obtain information such as the machine number of a printing apparatus, user ID, network ID or the like.

Increasing an AddOn level (an increase/decrease rate of the Y output value with respect to an original image) makes the forgery determination easy, but excessive increase of the AddOn level makes the AddOn conspicuous and deteriorates the image quality. On the other hand, excessive decrease of the AddOn level makes the determination difficult, and anti-forgery effect cannot be achieved. Therefore, it is important to form AddOn at a level at which AddOn is determinable, and to make the AddOn data visually inconspicuous.

However, the level at which AddOn is determinable is apt to depend upon a difference among apparatuses or levels of exhaustion or deterioration. Assume the case of image forming apparatuses A and B. The apparatus A is new and has no deterioration, thus has an excellent dot reproducibility. In this case, the apparatus A has a good AddOn determination level. On the other hand, the apparatus B is old and deteriorated, thus has a bad dot reproducibility. In this case, the apparatus B has a bad AddOn determination level.

In the above case, if the same AddOn addition level is set to both apparatuses A and B, the following problem occurs. More specifically, if the AddOn level of the image forming apparatus A is set to level 48, which is identical to that of the image forming apparatus B, the AddOn pattern stands out more than necessary in an image formed by the apparatus A. On the other hand, if the AddOn level of the image forming apparatus B is set to level 32, which is identical to that of the image forming apparatus A, determination of the AddOn pattern may be difficult in an image formed by the apparatus B.

In view of the above, the first embodiment adopts the following configuration. First, the image forming apparatus 100 adds AddOn to a test pattern at a predetermined addition level to form a test sample, and transfers the test sample to the maintenance apparatus. More specifically, the control device 102 reads a test pattern, AddOn data, and addition level stored in the storage device 105 (500 to 502 in FIG. 5). The control device 102 adds AddOn data to the read test pattern (503 in FIG. 5). To add the AddOn data, the Y level of AddOn dot is increased or decreased by the value corresponding to the predetermined addition level. The test sample generated in the foregoing manner is formed on a print material by the output device 103 (504 in FIG. 5). Image formation is performed in the foregoing manner. FIG.

8 shows an example of a test sample. This example simultaneously uses five addition levels.

The formed test sample is manually or automatically set to the reader 104. The reader 104 reads the test sample (505 in FIG. 5). The test sample, read by the reader 104, is transmitted to the maintenance apparatus through the communication IF (506 in FIG. 5).

Figure 5:
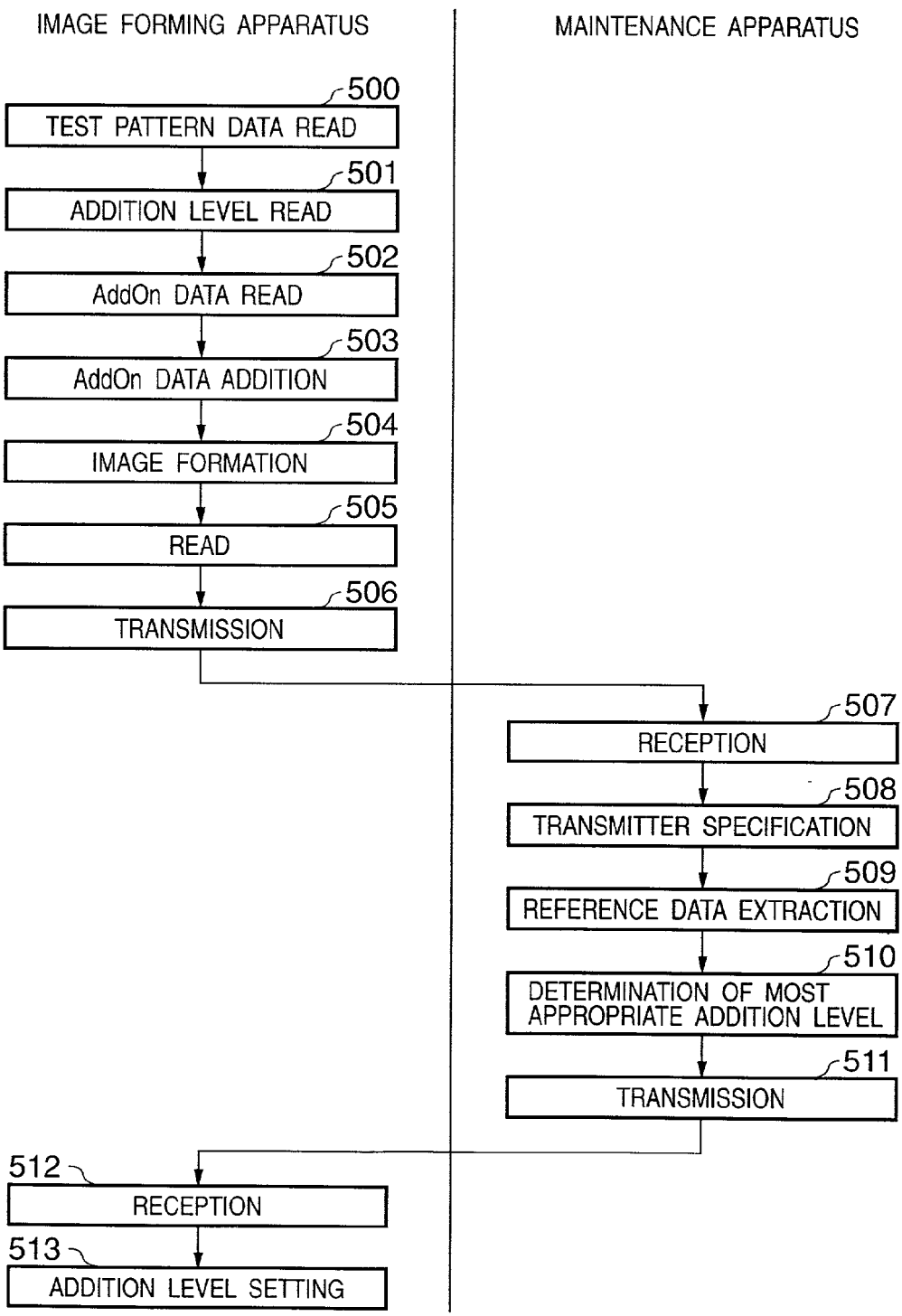
FIG. 5 is an exemplary flowchart according to an embodiment of the present invention.
Figure 6:
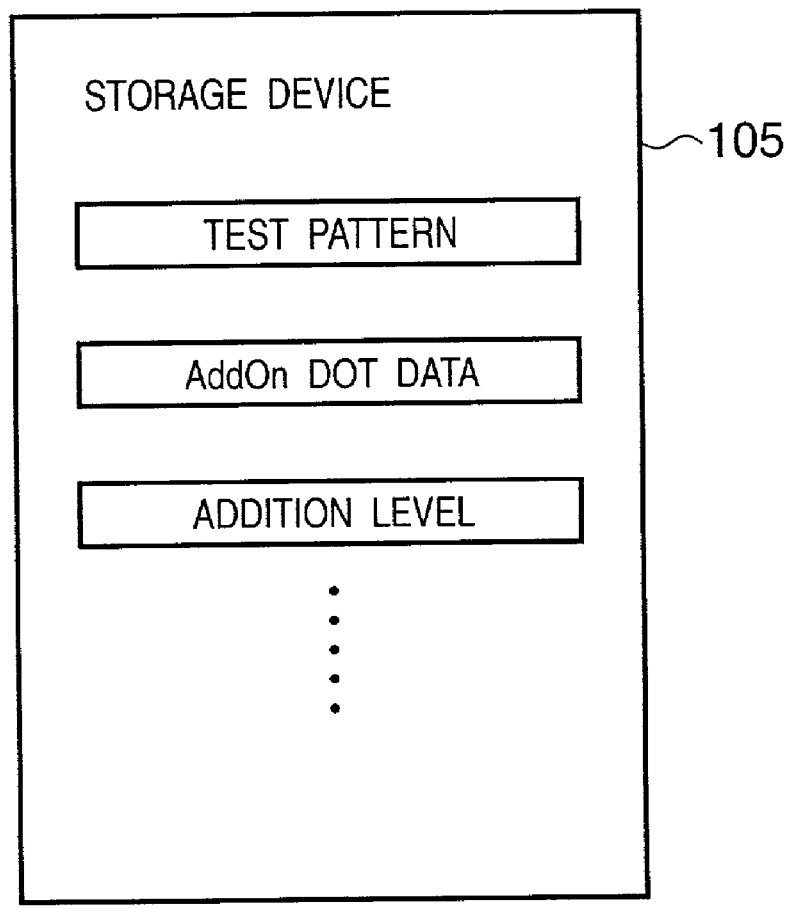
FIG. 6 is a view showing an exemplary storage of the image forming apparatus according to an embodiment of the present invention.
Figure 7:
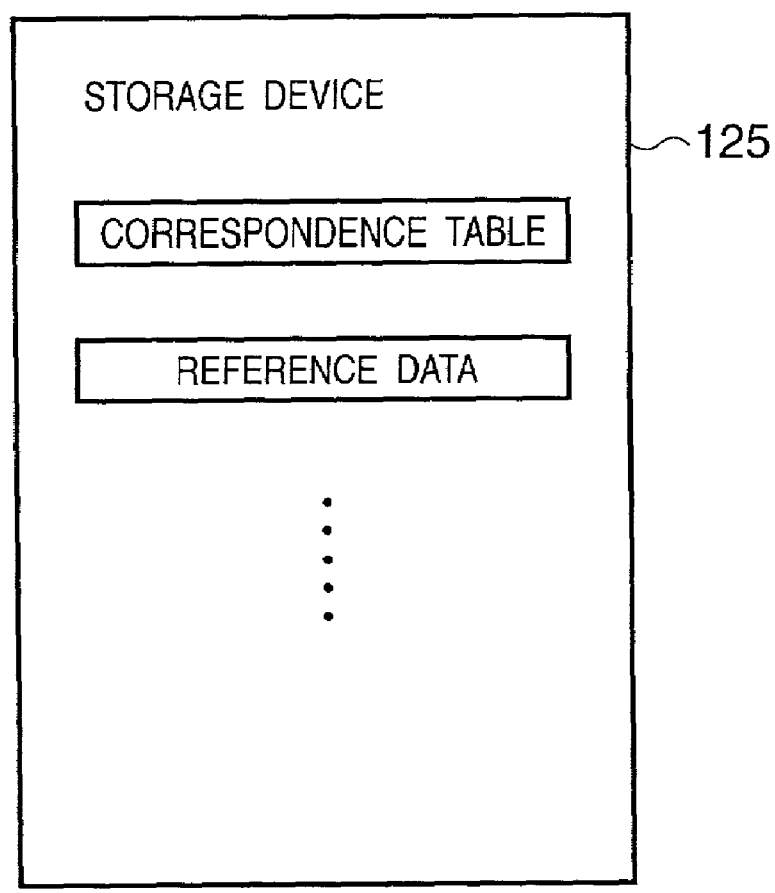
FIG. 7 is a view showing an exemplary storage of a maintenance apparatus according to an embodiment of the present invention.

The maintenance apparatus 120 receives the test sample, transmitted by the image processing apparatus 100, through the communication IF 121 (507 in FIG. 5). The received test sample is temporarily stored in the storage device 125.

The control device 122 of the maintenance apparatus 120 specifies which image forming apparatus has sent the test sample (508 in FIG. 5). The control device 122 specifies an image forming apparatus, for instance, by performing image recognition on the test sample to extract an identification number of an image forming apparatus included in the AddOn pattern, or by using a telephone number, IP address, and MAC address of an image forming apparatus obtained by the communication IF. The control device 122 extracts reference data for the specified image forming apparatus from a corresponding table of the storage device 125 (509 in FIG. 5). The corresponding table stores an identification number of the image forming apparatus, AddOn dot pattern for comparison, and the current addition level. The aforementioned reference data is an AddOn arrangement pattern or a test pattern used in determination of the most appropriate addition level, which is the same test pattern possessed by the image forming apparatus.

The control device 122 compares the received test sample with the AddOn pattern for comparison that is one of the reference data or the test pattern for comparison, and determines the lowest readable level as the most appropriate addition level for the image forming apparatus (510 in FIG. 5). For instance, assuming that AddOn is added to the test sample at addition levels of 32, 48, 64, 80, and 96, the control device selects an addition level which is readable but is not too conspicuous from these five levels.

The determination method is described in detail below. First described is the method of determining an addition level by comparing a received test sample with the test pattern for comparison. Difference operation is performed on the test sample and test pattern to extract dots having different values. Then, it is determined whether or not the extracted dots are located at the same positions as the original AddOn dot pattern. Next, it is determined whether or not the extracted dots are in an identifiable level. If the difference is not sufficient, the addition level is increased so as to make up the difference. If the difference is more than necessary, the addition level is decreased for the unnecessary difference.

The determination of the most appropriate addition level may be made by a user. In this case, a user determines an addition level based on an image to which AddOn dot pattern is added, which is displayed on a display device (not shown) of the maintenance apparatus 120, and inputs the most appropriate addition level to an input device connected to the maintenance apparatus 120. In the case a user determines an addition level, the addition level may be specified on the test sample with a numerical value to facilitate the determination.

When the addition level is determined in the foregoing manner, the control device 122 transmits the most appropriate addition level to the image forming apparatus through the communication IF 121 (511 in FIG. 5).

The image forming apparatus 100, which receives the most appropriate addition level through the communication IF (512 in FIG. 5), stores the addition level in the storage device 105 (513 in FIG. 5). The image forming apparatus 100 sets the addition level in this manner, and in the subsequent processing the image forming apparatus performs image formation adding anti-forgery information at the set addition level.

Note that although the foregoing embodiment is configured such that the image forming apparatus 100 transmits the test sample to the maintenance apparatus 120, it may be configured such that the image forming apparatus 100 determines density, numerical data, and character data of the test sample and transmits data indicative of the determined data to the maintenance apparatus 120, instead of transmitting the test sample. In this case, the image forming apparatus 100 can make the determination by reading the test sample by the reader 104 and causing control device 102 to execute a program for determining density, numerical and character data, stored in the storage device 105.

As has been described above, the first embodiment enables to adjust an AddOn addition level in accordance with the state of each machine. Therefore, determinable but not conspicuous AddOn addition becomes possible.

Second Embodiment

Figure 9:
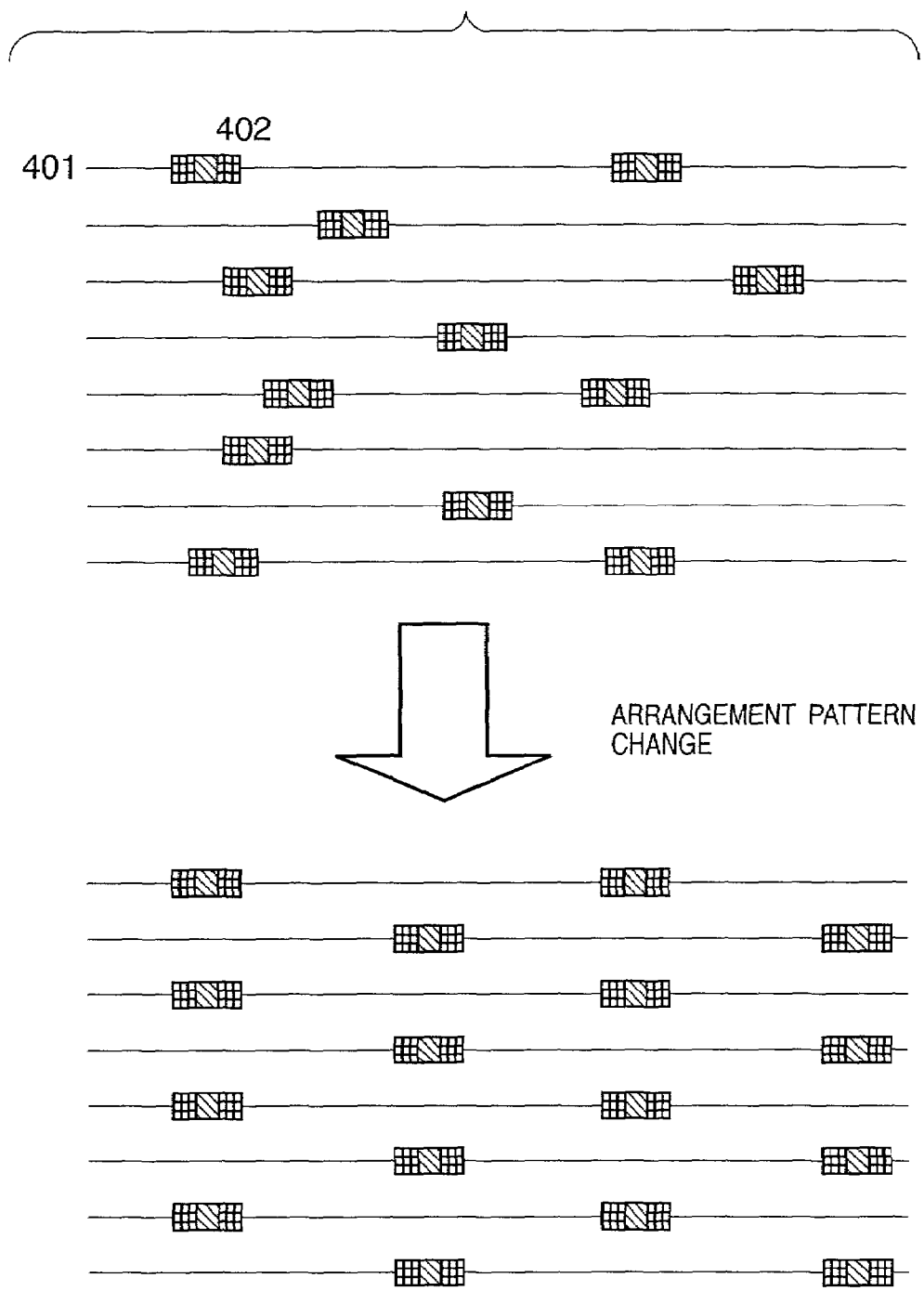
FIG. 9 is a view showing an exemplary arrangement of a test pattern according to an embodiment of the present invention.

According to the above-described first embodiment, the AddOn dot pattern normally outputted and the AddOn dot pattern outputted as a test pattern are identical. For the purpose of identifying each machine, an AddOn pattern should naturally have a unique arrangement for each machine. However, since the present invention uses the test pattern merely to determine whether or not the addition level of an AddOn dot is in a readable level, the AddOn having a regular arrangement as shown in FIG. 9 may be used. Normally, since AddOn is designed sufficiently small so as not to stand out, the regular arrangement of AddOn makes the determination of a most appropriate addition level easier. If all image forming apparatuses use the same AddOn dot pattern for a test pattern, the maintenance apparatus has a benefit of storing only one AddOn dot pattern. Furthermore, steps 508 and 509 are not necessary in the maintenance apparatus since there is no need to specify an image forming apparatus.

Third Embodiment

Figure 10:
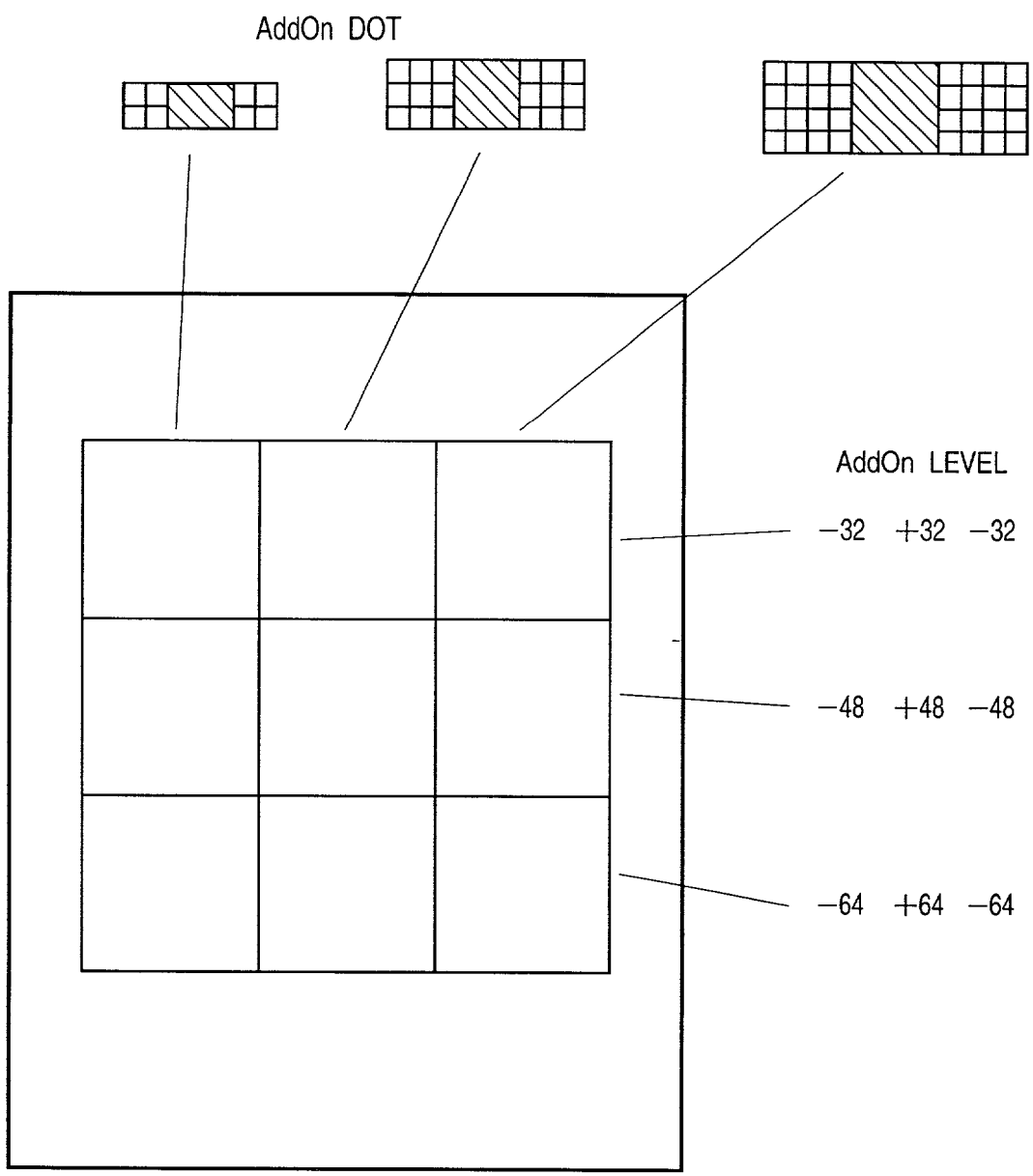
FIG. 10 is a view showing an exemplary arrangement of a test pattern according to an embodiment of the present invention.

According to the first embodiment, only the AddOn levels are changed. The third embodiment outputs nine types of test samples, where an AddOn pattern is divided into three levels (6*2, 9*3, 12*4) at three addition levels (32, 48, 64) as shown in FIG. 10. Then, a level at which AddOn is readable is determined by the processing similar to that of the first embodiment. The AddOn conspicuousness level is shown in the following table. The numerals 1 to 9 indicate conspicuousness levels, 1 being least conspicuous. A level, at which AddOn is readable and which has a lowest value in the following table, is selected as the AddOn addition level.

| size level | 32 | 48 | 64 |
| --- | --- | --- | --- |
| 6*2 | 1 | 2 | 3 |
| 9*3 | 4 | 5 | 7 |
| 12*4 | 6 | 8 | 9 |

As described above, the third embodiment enables to adjust an AddOn addition level depending on machines, and add readable but not conspicuous AddOn.

Fourth Embodiment

The foregoing first embodiment discloses a configuration for setting the most appropriate addition level by the maintenance apparatus 120. The fourth embodiment describes a configuration for managing whether or not an image forming apparatus appropriately employs the AddOn function regardless of an addition level, and a method of managing the type of AddOn information by the maintenance apparatus 120.

Figure 11:
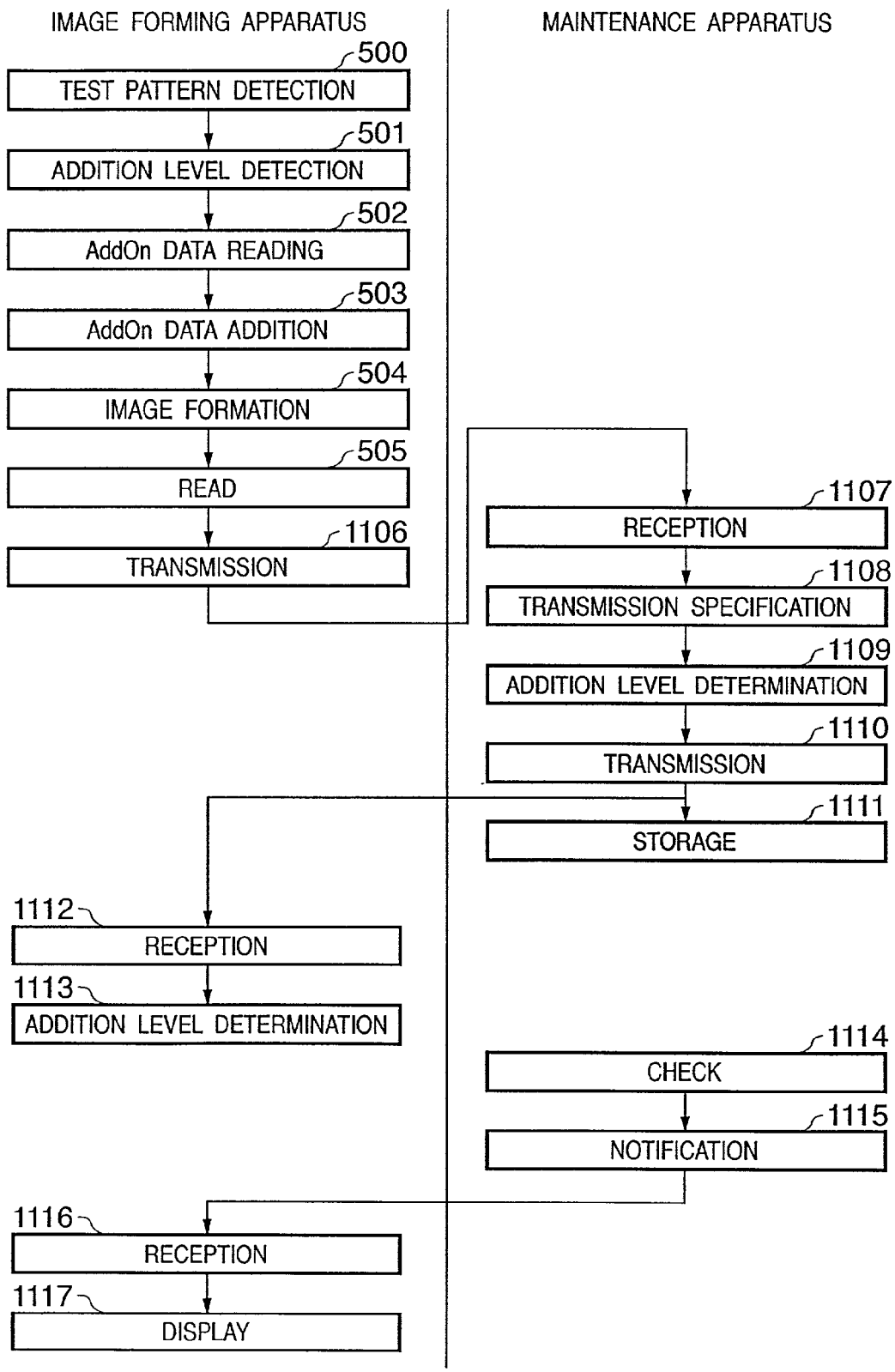
FIG. 11 is an exemplary flowchart according to an embodiment of the present invention.

The fourth embodiment has a system configuration basically the same as that shown in FIG. 1. The only difference is in that a program for realizing the processing shown in FIG. 11 is stored in the storage device 105 of the image forming apparatus 100 and the storage device 125 of the maintenance apparatus 120, and that the processing shown in FIG. 11 is realized by the control devices 102 and 122 executing the program. Since the steps 500 to 505 in FIG. 11 are the same as those in FIG. 5, description thereof will be omitted.

At step 1106 in FIG. 11, the image forming apparatus 100 transmits date information set in the image forming apparatus and counter information indicative of the number of sheets already printed, in addition to the aforementioned test sample. The date information is set in an operation unit (not shown) of the image forming apparatus by a service person at the time of installing the image forming apparatus 100 or by an owner of the image forming apparatus 100. The counter information indicates the total number of times of printing counted every time the image forming apparatus 100 performs printing. The maintenance apparatus 120 receives the information transmitted by the image forming apparatus (1107), and recognizes an identification number, telephone number, IP address, and MAC address of the image forming apparatus 100 as similar to the first embodiment (1108). The maintenance apparatus 120 determines the most appropriate addition level for the image forming apparatus 100 as similar to the first embodiment (1109). Upon determining the addition level, the control device 122 transmits the most appropriate addition level to the image forming apparatus 100 through the communication IF 121 (1110). In addition, the maintenance apparatus 120 stores the identification number, telephone number, IP address and MAC address in association with other received information (date information, counter information, and addition level transmitted) in the storage device 125 (1111).

The image forming apparatus 100, which receives the most appropriate addition level through the communication IF 101 (1112), stores the addition level in the storage device 105. The image forming apparatus 100 sets (corrects) an addition level in this manner, and in the subsequent processing, performs image formation adding anti-forgery information (visually inconspicuous AddOn data) at the set addition level (1113).

Furthermore, the maintenance apparatus 120 periodically checks the date information, counter information, addition level information which have already been stored in the storage device 125 (1114). With reference to the date at which the most appropriate addition level is determined, recent changes in the counter value (the state of utilization), and addition level, the maintenance apparatus 120 determines a date predicted to require correction of the most appropriate addition level, and notifies the image forming apparatus 100 of this matter through the network 110 (Internet, intranet or the like) on the predicted date (1115). The notification is received by the image forming apparatus (1116), and displayed on a display unit (not shown) of the image forming apparatus 100 (1117). Accordingly, an owner of the image forming apparatus 100 can perform correction of the addition level at an appropriate timing. Since the received data stored in the storage device 125 can be displayed on a display unit (not shown) of the maintenance apparatus 120, an operator of the maintenance apparatus 120 can confirm changes in the addition level according to the number of times of image formation using the AddOn function, thereby monitoring appropriate utilization of the AddOn function by the image forming apparatus 100.

Figure 12:
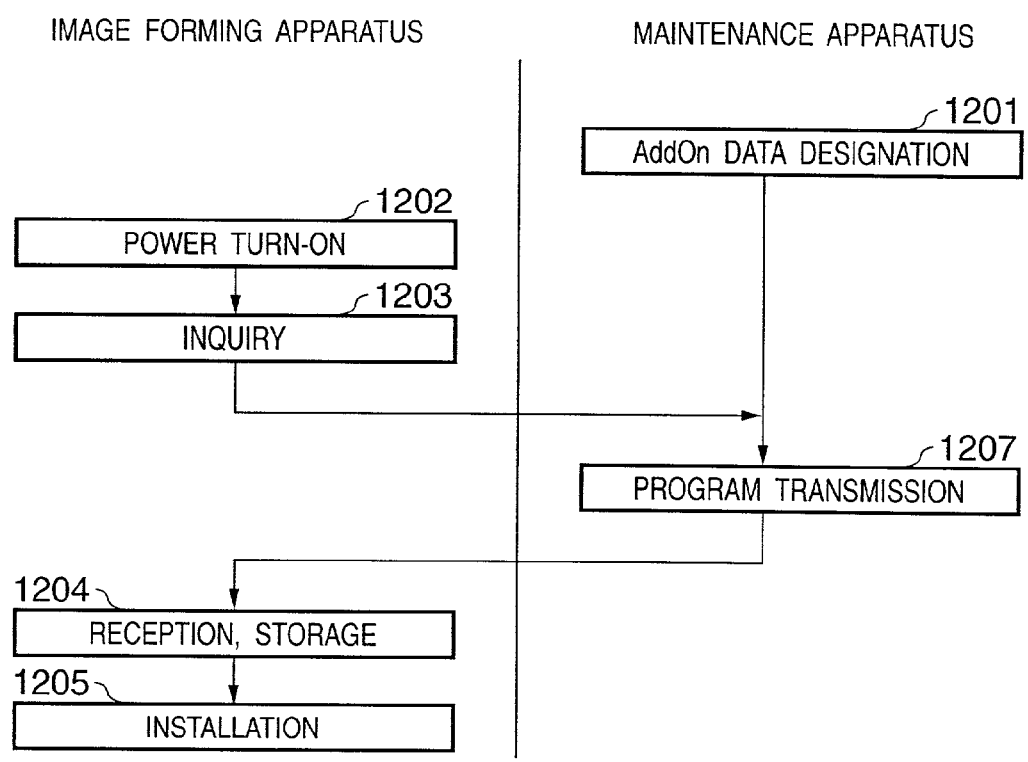
FIG. 12 is an exemplary flowchart according to an embodiment of the present invention.

Although the first embodiment is configured to add a machine number as AddOn information, other types of information can be added by the maintenance apparatus 120. FIG. 12 is a flowchart showing addition processing.

An operator of the maintenance apparatus designates (adds) information to be newly added as AddOn information to the image forming apparatus 100 in an operation unit (not shown) of the maintenance apparatus 120 (1201). When the image forming apparatus 100 is turned on, the image forming apparatus 100 takes few minutes to reach an image-formation ready state. At this timing, the image forming apparatus 100 inquires the maintenance apparatus 120 through the network 110 as to whether or not there is additional AddOn information (1202). The maintenance apparatus 120, which has received the designation at the previous step (1201), acquires the type of information to be newly added as well as information to be newly added and transmits a program for embedding the information to an image through the communication IF 121 and 101. An example of newly adding information is date information or the like. This program is stored in the storage device 120 when the designation is made in the aforementioned step (1201).

Furthermore, the image forming apparatus 100 includes an adapter (not shown) for a memory card storing images picked up by a digital camera. In a case of forming an image, picked up by a digital camera and stored in the memory card, the newly adding information may be a manufacturer's name or a model name of a digital camera used for image pickup which is written in the image file (Exif or the like) as additional information. Besides the manufacturer's name or model name extracted from the memory card as newly adding information, other information for specifying an image pickup device, input apparatus, or printing apparatus used to obtain the image may be added assuming a case of fraudulent usage of the image. Moreover, newly adding information may be settings of an image pickup apparatus, input apparatus, or printing apparatus at the time of image pickup, input, or printing (use of flash, image sensing mode: portrait mode, macro mode and so on, lens used, resolution, γ, print mode: photograph mode, character mode and so on) or information related to an owner of the image, such as copyright information.

The image forming apparatus 100 stores the received program in the storage device 105, installs the program to add the information to be added at the time of image formation (1204). When the image forming apparatus 100 is turned on again, the image forming apparatus 100 can add the new AddOn information, in addition to the machine number, on a formed image without making it visually conspicuous.

The image forming apparatus 100 makes inquiry to the maintenance apparatus 120 not necessarily at the aforementioned timing, but at any timing predetermined in the image forming apparatus 100 or a timing at which the image forming apparatus 100 shifts to a power-saving mode.

The maintenance apparatus 120 is able to select from its operation unit whether to add additional information only on a specified image forming apparatus or on all image forming apparatuses connected to the network. Furthermore, when an operator designates to list all AddOn information on the operation unit of the maintenance apparatus 120, a display unit (not shown) of the maintenance apparatus displays a list of information added at the time of image formation with respect to all image forming apparatuses (which is capable of AddOn data addition) managed by the maintenance apparatus 120. In this manner, the maintenance apparatus 120 can manage all AddOn information for each of the image forming apparatuses.

Other Embodiments

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium (or recording medium), storing program codes of a software realizing the above-described functions of the embodiments, to a computer system or apparatus, reading the program codes, by a CPU or MPU of the computer system or apparatus, from the storage medium, then executing the program. In this case, the program codes read from the storage medium realize the functions according to the embodiments, and the storage medium storing the program codes constitutes the invention. Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

In a case where the present invention is applied to the aforesaid storage medium, the storage medium stores program codes corresponding to the flowchart described in FIG. 5.

As has been set forth above, the present invention enables to appropriately add anti-forgery information to an image by obtaining an individual difference among image forming apparatuses, and changing an anti-forgery information addition level in consideration of the individual difference.

As many apparently widely different embodiments of the present invention can be made without departing from the spirit and scope thereof, it is to be understood that the invention is not limited to the specific embodiments thereof except as defined in the claims.

What is claimed is:

1. A maintenance apparatus comprising:
reception means for receiving date information and addition level information of information to be added to an image by an image forming apparatus which electro-photographically forms a toner image;
determining means for determining based on the received information, a date at which notification recommending correction of the addition level is to be sent to the image forming apparatus; and
transmitting means for transmitting the notification to the image processing apparatus on the determined date,
wherein a timing of the notification is determined based on a date at which the addition level correction was last conducted and a utilization state of the image processing apparatus.

2. The maintenance apparatus according to claim 1, wherein the information to be added to the image is added by a visually inconspicuous method.

3. The maintenance apparatus according to claim 1, wherein the addition level varies in correspondence with deterioration of the image processing apparatus.

4. A method comprising the steps of:
receiving date information and addition level information of information to be added to an image by an image forming apparatus which electro-photographically forms a toner image;
determining based on the received information, a date at which notification recommending correction of the addition level is to be sent to the image forming apparatus; and
transmitting the notification to the image processing apparatus on the determined date,
wherein a timing of the notification is determined based on a date at which the addition level correction was last conducted and a utilization state of the image processing apparatus.

5. The method according to claim 4, wherein the information to be added to the image is added by a visually inconspicuous method.

6. The method according to claim 4, wherein the addition level varies in correspondence with deterioration of the image processing apparatus.

7. A computer program product, embodied in a computer-readable medium, for executing a method comprising the steps of:
receiving date information and addition level information of information to be added to an image by an image forming apparatus which electro-photographically forms a toner image;
determining based on the received information, a date at which notification recommending correction of the addition level is to be sent to the image forming apparatus; and
transmitting the notification to the image processing apparatus on the determined date,
wherein a timing of the notification is determined based on a date at which the addition level correction was last conducted and a utilization state of the image processing apparatus.

8. The computer program product according to claim 7, wherein the information to be added to the image is added by a visually inconspicuous method.

9. The computer program product according to claim 7, wherein the addition level varies in correspondence with deterioration of the image processing apparatus.

* * * * *